United States Patent [19]
Morse

[11] 3,743,412
[45] July 3, 1973

[54] APPARATUS FOR RECORDING IMAGES APPEARING ON A DISPLAY SURFACE

[75] Inventor: John E. Morse, Rochester, N.Y.

[73] Assignee: Eastman Kodak Company, Rochester, N.Y.

[22] Filed: July 13, 1971

[21] Appl. No.: 162,284

Related U.S. Application Data

[63] Continuation of Ser. No. 854,870, Sept. 3, 1969, abandoned.

[52] U.S. Cl............... 355/18, 355/66, 95/86, 346/33, 346/110
[51] Int. Cl. ............................................. G03b 5/00
[58] Field of Search ............ 355/18, 44, 45, 66, 355/69; 95/86; 346/33, 1, 110

[56] References Cited
UNITED STATES PATENTS

| | | | |
|---|---|---|---|
| 2,537,040 | 1/1951 | Doyle | 346/33 |
| 1,644,781 | 10/1927 | Holman | 355/66 |
| 2,399,992 | 5/1946 | Dye | 355/69 |

Primary Examiner—John M. Horan
Attorney—W. H. J. Kline et al.

[57] ABSTRACT

Improved apparatus for recording and reproducing copies of images displayed upon the display surface of devices such as a Cathode Ray Tube. The improved apparatus includes a camera assembly mounted adjacent a display device, support means movable from a retracted position wherein the display surface is cleared for unobstructed viewing thereof to an extended position wherein a reflecting surface carried by the support means can be adjusted to direct images from the display surface to lens means incorporated in the camera assembly. The lens means, in turn, forms the received images on recording material suitably arranged within the camera assembly.

The improved apparatus further includes a flexible light shield cooperatively associated with the movable support means, the display surface and the lens means for preventing ambient light from impinging upon the lens means when the reflecting surface has been moved by the support means to the extended position.

9 Claims, 3 Drawing Figures

JOHN E. MORSE
INVENTOR.

3,743,412

APPARATUS FOR RECORDING IMAGES APPEARING ON A DISPLAY SURFACE

CROSS-REFERENCES TO RELATED APPLICATIONS

This is a continuation of my earlier filed application Ser. No. 854,870, filed Sept. 3, 1969 now abandoned. Reference is made to commonly assigned copending U.S. Pat. application Ser. No. 625,590, entitled "Radiation Sensitive Silver Halide Systems," filed Mar. 24, 1967 in the name of Bacan and Barbier and U.S. Pat. application Ser. No. 481,918, entitled "Photodevelopment of Silver Halide Print-out Materials," filed Aug. 23, 1965 in the name of Colt and U.S. Pat. application Ser. No. 854,482, entitled "Control Apparatus for Developing Processor" filed Sept. 2, 1969, in the name of Claire L. James.

BACKGROUND OF THE INVENTION

1. Field of the Invention

This invention relates to apparatus for recording and reproducing copies of images derived from diverse image display devices and, more particularly, to improved apparatus for achieving this result without concern for ambient light impinging upon lens means employed in the apparatus.

2. Description of the Prior Art

It is often desirable to provide a permanent record or copy of an image displayed upon a display device such as a cathode ray tube. As is well recognized in the art, cathode ray tubes may be used in a home television set to display continuously moving images and in test instruments to display curves representing the cyclic variations of electrical signals. Copies of such displayed images could be provided by mounting a camera, e.g. of the rapid print developing variety, on the face of the cathode ray tube and then taking a number of exposures dependent upon the number of copies of the displayed image that were desired. This approach involves the disadvantages of providing copies, whose size is inherently limited by the size of the camera unless a negative is made of the copy and an enlarged print is printed from the negative. Further, special mounts are normally required to adapt such cameras to be mounted in front of the display screen. As a result, such cameras are not readily adaptable to be mounted upon many diverse types of cathode ray tubes. Further, while the camera is mounted in front of the cathode ray tube, the operator is prevented from easily seeing the image being instantaneously displayed upon the cathode ray tube.

Further, systems have been provided for providing copies of images displayed upon the display screen of cathode ray tubes. Typically, these systems have been mounted within a single housing in which the physical mounting and optical connections between the cathode ray tube and the reproducing mechanism are substantially fixed as to inhibit the adaptation of the reproducing mechanism to record and to provide copies of the images displayed on diverse types of cathode ray tubes. In addition, appropriate control circuitry may typically be provided to synchronize the display of information upon the cathode ray tube with the recording of the displayed image by the camera or reproducing mechanisms.

Another typical problem of such prior art systems was their distinct disadvantage in the recording mode due to the impingement of ambient light on the camera lens.

It is an object of this invention to provide a camera apparatus which is readily adapted to record and to copy the image displayed on many diverse types of display devices such as cathode ray tubes.

It is a more specific object of this invention to provide a camera apparatus which is adapted to be mounted upon many diverse types of display devices such as cathode ray tubes without permanent physical or electrical connection to such display devices.

It is yet another object of the present invention to provide such a camera apparatus with a light shield for screening the lens thereof from the impingement of ambient light.

SUMMARY OF THE INVENTION

These and other objects are accomplished in accordance with the teachings of this invention by providing a camera apparatus which is adjustably adapted to be mounted upon many diverse types and sizes of display devices such as cathode ray tubes. More specifically, the camera apparatus includes a support assembly including a plurality of legs whose height may be adjusted and a mechanism for adjusting the angular position of the camera apparatus with respect to a display screen (or surface) of the display device. Further, the camera apparatus of this invention includes a reflective surface such as a mirror which may be disposed between a retracted position remote from the display surface of the display device and an extended position whereat the reflective surface directs the image from the display surface onto an exposure station of the camera apparatus to thereby record and to provide a copy of the displayed image. In addition, a mechanism is provided for adjusting the second position of the reflective surface with respect to the camera apparatus.

Also provided is a flexible light shield for preventing ambient light from impinging upon the camera apparatus lens when the reflective surface is moved to the extended position.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
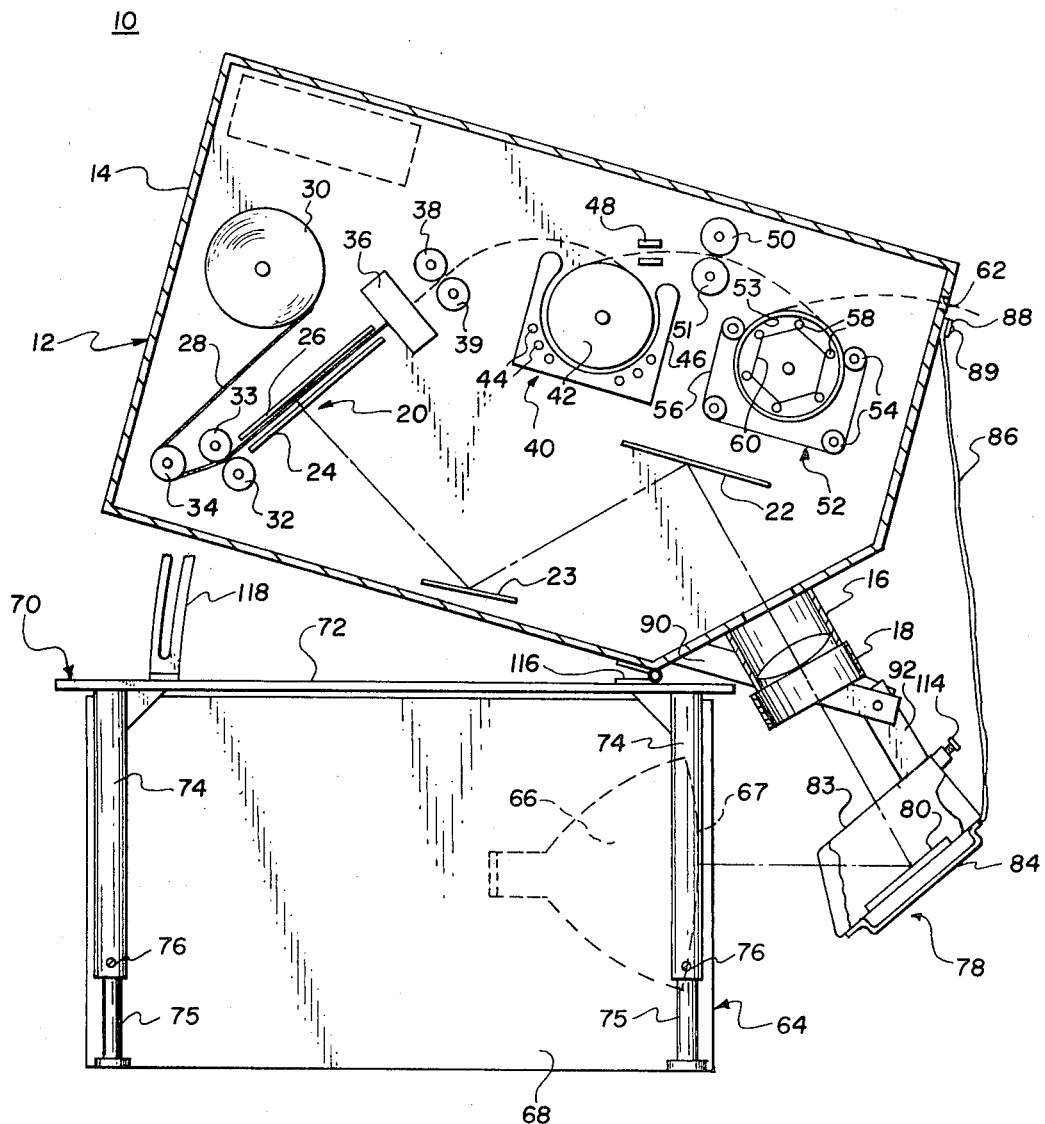
FIG. 1 is a side view schematically showing an adjustably mountable camera apparatus in accordance with the teachings of this invention.

With reference now to the drawings and in particular to FIG. 1, there is shown a free standing camera assembly 10 including a camera or reproducing assembly 12 adjustably mounted by a camera support assembly 70 so as to be able to record and provide a copy of varying display devices such as a cathode ray tube display device 64. The camera assembly 12 includes a housing 14 upon which there is disposed a lens assembly 16 for focusing the image derived from the cathode ray tube display device 64 onto an exposure station 20. A shutter 18 is mounted upon the lens assembly 16 and serves to expose the exposure station 20 to the displayed image for a period of time sufficient to expose a latent image onto that portion of a web 28 of sensitized paper disposed at the exposure station 20. A plurality of reflective surfaces 80, 22 and 23 serve to direct the image from the cathode ray tube display device 64 onto the exposure station 20 in its original orientation. As seen in FIG. 1, the exposure station 20 includes a transparent platen 24 made of a suitably transparent material such as glass for transmitting the displayed image onto the web 28, and a back-up platen 26. A narrow opening is provided between the transparent platen 24 and the back-up platen 26 through which the web 28 of sensitized paper is directed.

A roll 30 of the web 28 of sensitized paper is mounted within the housing 14 to be withdrawn over a spacing roller 34 by a pair of metering rollers 32 and 33. As explained in the above-identified copending application entitled "Control Apparatus for Developing Processor," the metering rollers 32 and 33 serve to withdraw a measured length of the web 28 of sensitized paper. Illustratively, it may be desired to produce a letter-size copy of the image displayed upon the cathode ray tube display device 64, and the metering rollers 32 and 33 would be controlled to advance approximately 11 inches of the web 28 of sensitized paper. Next, the shutter 18 would be activated to thereby expose that portion of the web 28 disposed at the exposure station 20 with a latent image. At the end of the exposure cycle, the exposed portion of the web 28 would be advanced by the metering rollers 32 and 33 to thereby introduce an unexposed portion of the web 28 into the exposure station. The exposed portion of the web 28 is then severed by a cutting assembly 36 and advanced by intermediate drive rollers 38 and 39 to a heating assembly 40.

There will be described a two-step development process including a stabilizing step in which the severed portion of the sensitized paper is subjected to heat and a second step of developing or photolyzing the latent image disposed thereon at a photolyzer assembly 52. The web 28 of sensitized material could illustratively take the form of a material as described in the above-identified copending application, Ser. No. 481,918, and the steps and parameters of the process by which such paper is developed are more completely and illustratively described in the above-identified copending application, Ser. No. 625,590.

As shown in FIG. 1 and described in the above-identified copending Ser. No. 625,590, it is preferable to use a type of processing apparatus that does not involve the use of liquids or other expendibles other than the sensitive paper itself. If the camera and developing apparatus are to be portable so as to be mounted upon various display devices, it would be desirable not to use liquid treating fluids which might spill upon a display device. Further, the developing apparatus should not be adversely influenced by gravity since the developing apparatus of this invention may be reorientated to focus the image from the display device 64 onto the exposure station 20. Such requirements are met by apparatus capable of developing the exposed photographic material by the application of heat, which will be described in detail below.

As shown in FIG. 1, the heater assembly 40 includes a drum 42 rotatively driven in a clockwise direction to thereby subject uniformly the severed sheet of sensitized paper to heat generated by a plurality of heating elements 44. The heating elements 44 are disposed or embedded within a reflecting assembly 46 which substantially surrounds the drum 42. After the piece of sensitized paper has been rotated by the drum 42 through the heating assembly 40, it is directed through a heat sink 48 to a pair of intermediate drive rollers 50 and 51 to the photolyzer assembly 52. The photolyzer assembly 52 includes a rotatably driven drum 53 made of a transparent material. Inside the drum 53, there is disposed a plurality of suitable sources 58 of ultraviolet radiation such as lamps and a reflector assembly 60 for uniformly exposing the sheet of sensitized paper to radiation in the ultraviolet range and thereby photolyzing (or developing) the latent image thereon. A belt (or plurality of belts) 56 is mounted on idling rollers 54 so that a portion of the belt 56 may follow the contour of the drum 53. As is apparent from FIG. 1, the belt 56 serves to place the severed sheet of sensitized material into intimate contact with the surface of the drum 53. After completion of the two-step developing process, the developed sheet of sensitized paper is directed through an exit opening 62 within the housing 14. For a more complete description of the heater assembly 40, the photolyzer assembly 52 and the mechanism for driving these assemblies, reference is made to the copending application entitled "Control Apparatus for Developing Processor," by Claire L. James.

Figure 2:
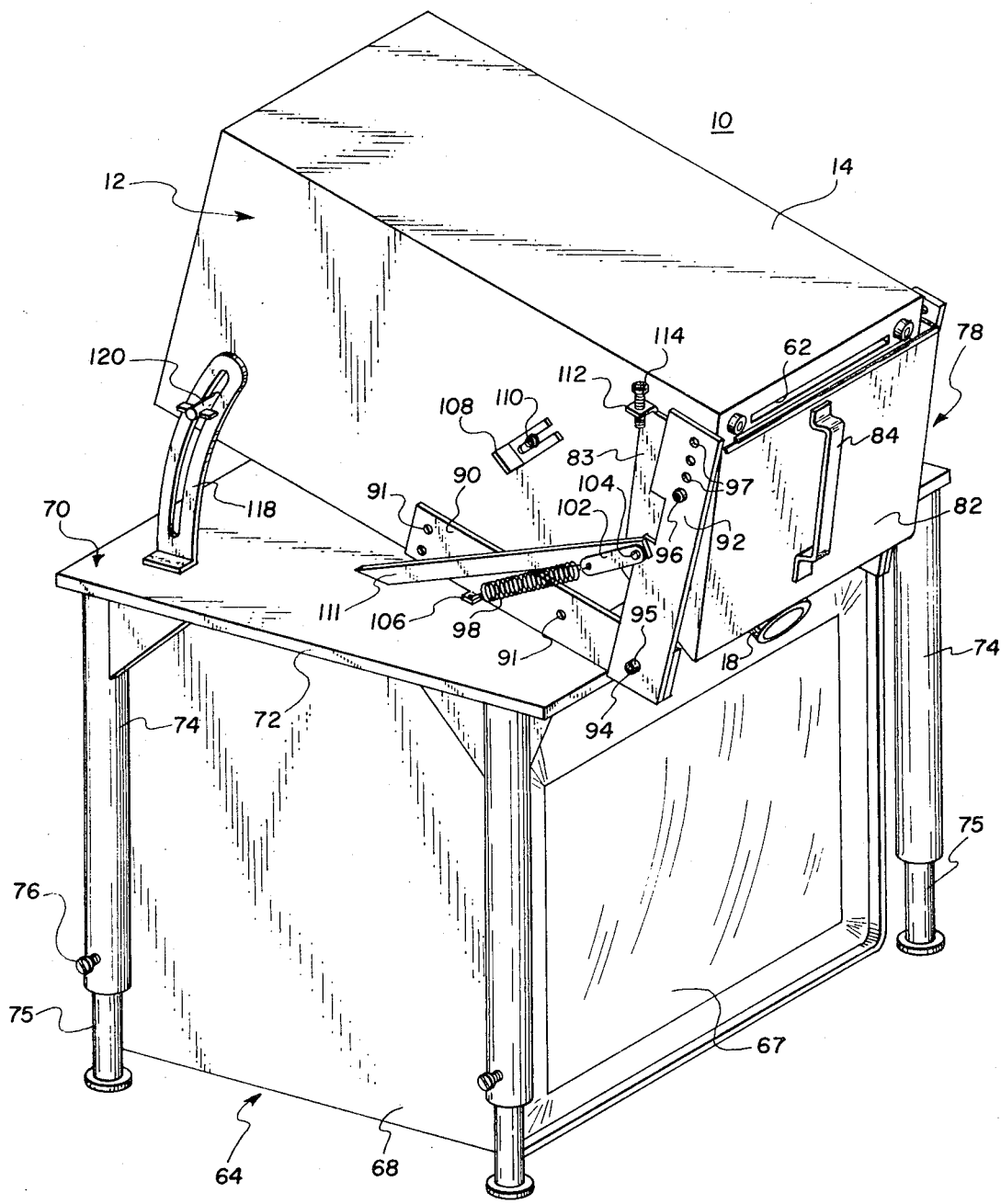
FIG. 2 is an orthogonal view of the camera apparatus shown in FIG. 1 showing an assembly for mounting a reflective surface, the assembly being disposed in its remote or first position.

With reference now to FIGS. 1 and 2, the cathode ray tube display device 64 includes a cathode ray tube 66 having a display surface 67 upon which images are disposed in a manner well known in the art. The cathode ray tube 66 is disposed within a housing 68 upon which the camera support assembly 70 mounts the camera assembly 12. The camera support assembly 70 includes a mounting plate 72 upon which the camera assembly 12 is pivotally mounted as shown in FIG. 1 by a hinge 116. The angular orientation of the camera assembly 12 with respect to the mounting plate 72 may be adjustably selected so that the image derived from the display surface 67 may be reflected from the reflective surface 80 into the camera assembly 12. It may be understood that the free standing camera assembly 10 of this invention is adapted to reproduce images derived from many diverse types of display devices having display surfaces of various sizes and disposed at various heights and angles. More specifically, this may be accomplished by pivoting the camera assembly 12 about the hinge 116 and by selectively disposing the camera assembly 12 with respect to the mounting plate 72 by tightening a pair of wing nuts 120 to secure the housing 14 to a pair of support brackets 118. In addition, the height of the mounting plate 72 may be adjusted to accommodate housings 64 of various sizes. More specifically, the mounting plate 72 is supported by four legs 74 having, respectively, leg extensions 75 which may be extended or retracted and selectively held by set screws 76.

Figure 3:
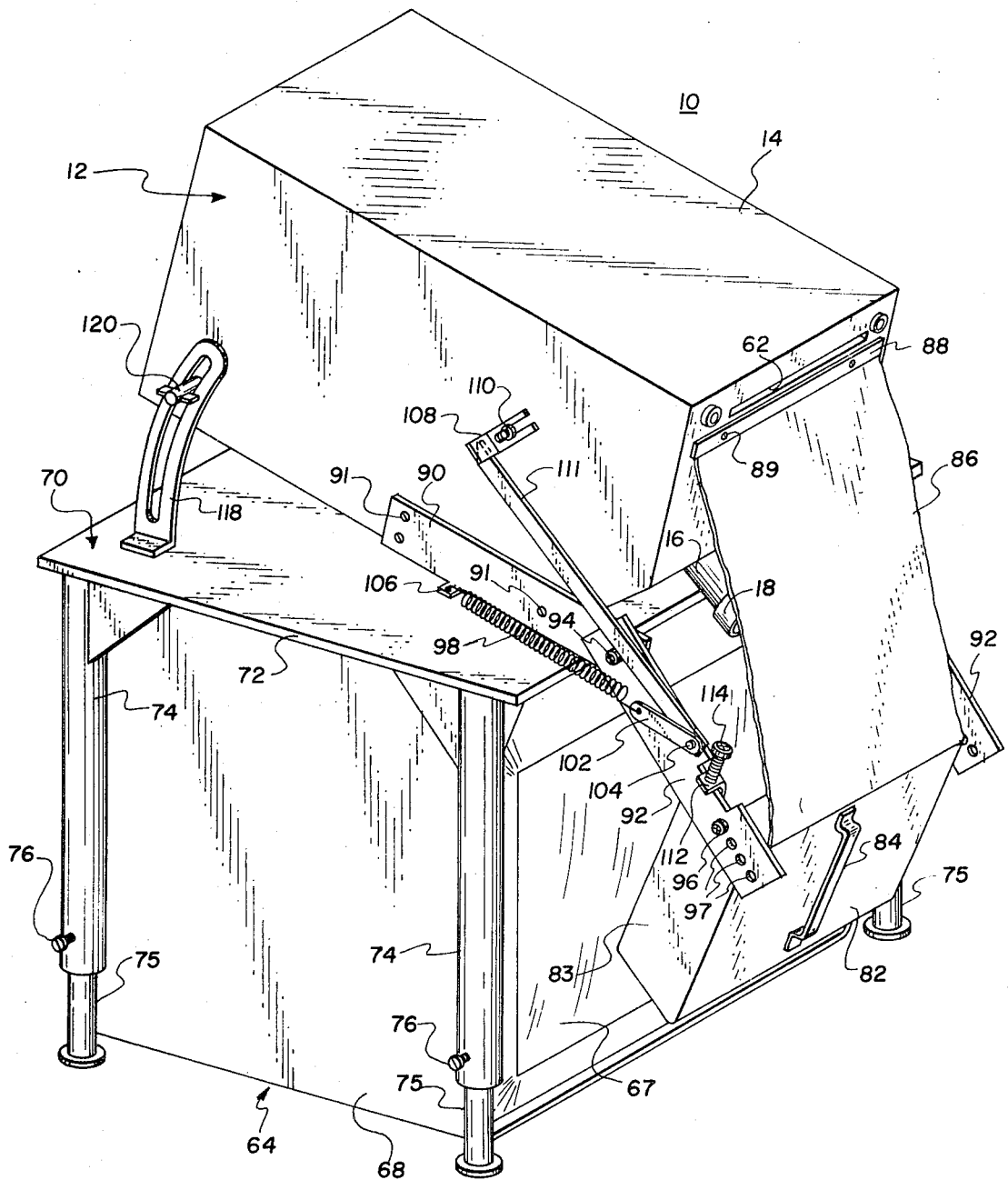
FIG. 3 is an orthogonal view of the camera apparatus shown in FIGS. 1 and 2 showing the mounting assembly disposed in its second or operative position whereat the image displayed upon the cathode ray tube is directed by the reflective surface onto the exposure station of the camera apparatus.

In FIGS. 2 and 3, there is shown a pull-down assembly 78 for adjustably disposing the reflective surface 80 from a first position, as shown in FIG. 2, remote from the display surface 67 to thereby allow an operator to clearly view the display surface 67, to a second position, as shown in FIG. 3, wherein the reflective surface 80 is disposed to direct the image derived from the display surface 67 onto the camera assembly 12. The pull-down assembly 78 includes a U-shaped light hood 82 upon which is mounted the reflective surface 80. The light hood 82 has a pair of side members 83 and a handle 84 which may be grasped by the operator for moving the pull-down assembly 78 from its retracted position, as shown in FIG. 2, to its extended position, as shown in FIG. 3. A flexible light shield 86 made of a suitable opaque material is secured at one end to the light hood 82 and at its other end to the housing 14. More specifically, the light shield 86 is secured by a plate 88 and a plurality of suitable fasteners such as screws 89 to the housing 14. It is noted that the flexible light shield 86 and the U-shaped light hood 82 serve to prevent ambient light from being directed into the lens assembly 16 when an exposure is being made. The light hood 82 is mounted upon the housing 14 by a pair of bracket members 90 and is secured thereto by suitable connecting means such as screws 91. In turn, a pair of pivoting members 92 are rotatively connected to the bracket members 90 by a pair of bolts 94 disposed through a pair of sleeves 95 and holes within the bracket members 90 and pivoting members 92. The U-shaped, light hood 82 is rotatively connected to the pivoting members 92 by a pair of bolts 96, respectively. As shown clearly in FIG. 3, a plurality of mounting openings 97 are provided within the pivoting members 92 to allow a choice of positions for the reflective surface 80 and the accommodation of various sizes and styles of cathode ray tube display devices 64. With reference to FIG. 2, a pair of spring members 98 are interconnected between the bracket members 90 and the pivoting members 92 to bias the pull-down assembly 78 toward its retracted position as shown respectively in FIGS. 2 and 3. More specifically, a first end of the spring members 98 are connected to L-shaped brackets 106, which are in turn connected to the bracket members 90. A second end of the spring members 98 are connected to linking members 102 which are in turn connected by a pair of bolts 104 to the pivoting members 92.

With reference to FIG. 3, a pair of positioning arms 111 serve to define the extended position of the pull-down assembly 78. More specifically, the positioning arms 111 are connected at one end to the pivoting members 92 by the bolt 104. The other end of the positioning arms 111 are engageable respectively with a pair of L-shaped stop members 108 which are adjustably secured by set screws 110 to each side of the housing 14. Thus, the pivoting members 92 and the light hood 82 may be rotated to an extended position which is limited and thereby determined by the engagement of the positioning arms 111 with the L-shaped stop members 108. More specifically, the positioning arms 111 will engage the sleeves 95 disposed about the bolts 94, and also the L-shaped stop members 108 to thereby determine the extent of rotation of the pivoting members 92.

The angular position of the U-shaped light hood 82 and therefore the reflective surface 80 may be further adjusted by a pair of set screws 114 which are mounted upon a pair of ears 112 connected to the side members 83 of the light hood 82. By selectively adjusting the set screws 114, the degree of rotation about the bolts 96 and therefore the angular position of the light hood 82 and the reflective surface 80 with respect to the display surface 67 may be adjusted.

The invention has been described in detail with particular reference to a preferred embodiment thereof, but it will be understood that variations and modifications can be effected within the spirit and scope of the invention.

We claim:

1. In apparatus for recording images appearing on the display surface of a display device, said apparatus being adapted for placement adjacent the display device and having lens means to form images on recording material within said apparatus, the improvement comprising:
   a. support means mounted to the recording apparatus and movable between a retracted position and an extended position;
   b. a reflective surface mounted to said support means and movable therewith from said retracted position clearing the display surface of the adjacent display device for unobstructed viewing thereof, to said extended position wherein said reflective surface can direct images from the display surface of the adjacent display device to said lens means; and
   c. light shielding means operatively associated with said recording apparatus and said reflective surface for preventing ambient light from impinging upon said lens means when said reflective surface is in said extended position; said support means including a pair of L-shaped brackets, the legs of which are pivotally connected at their juncture, one of said legs of each of said brackets being mounted to said recording apparatus and the other one of said legs of each of said brackets having a plurality of mounting holes spaced along the length thereof for adjustably receiving said reflective surface therebetween.

2. The apparatus of claim 1 wherein said light shielding means includes a flexible shield mounted to said recording apparatus above said lens means and to said support means about said reflective surface and movable therewith from said retracted position to said extended position.

3. The apparatus of claim 2 which further includes biasing means connected between said support means and the recording apparatus for urging said support means towards said retracted position.

4. The apparatus of claim 3 which further includes a U-shaped light hood pivotally mounted between said mounting holes therein, said light hood having said reflective surface located on the inner side of the base segment thereof.

5. The apparatus of claim 4 which additionally comprises a handle mounted to the exterior side of the base of said U-shaped light hood to facilitate operator initiated movement of said support means and said light hood between said retracted and said extended positions.

6. The apparatus of claim 1 which further includes a U-shaped light hood pivotally mounted between said legs of said brackets having said mounting holes therein, said light hood having said reflective surface located on the inner side of the base segment thereof.

7. The apparatus of claim 6 which additionally comprises a handle mounted to the exterior side of the base of said U-shaped light hood to facilitate operator initiated movement of said support means and said light hood between said retracted and said extended positions.

8. The apparatus of claim 2 which further includes a U-shaped light hood pivotally mounted between said legs of said brackets having said mounting holes therein, said light hood having said reflective surface located on the inner side of the base segment thereof.

9. The apparatus of claim 8 which additionally comprises a handle mounted to the exterior side of the base of said U-shaped light hood to facilitate operator initiated movement of said support means and said light hood between said retracted and said extended positions.

* * * * *

PO-1050
(5/69)

UNITED STATES PATENT OFFICE
CERTIFICATE OF CORRECTION

Patent No. 3,743,412        Dated July 3, 1973

Inventor(s)  John E. Morse

It is certified that error appears in the above-identified patent and that said Letters Patent are hereby corrected as shown below:

In the Abstract, line 5, delete "support means" and insert --a pull-down assembly--;
line 8, delete "support " and insert --pull-down assembly--;
line 9, delete "means";
line 10, after "to" insert --a--; same line, delete "means";
line 11, delete "means";
line 16, delete "support means" and insert --pull-down assembly--; same line, after "lens" delete "means";
line 18, delete "means".

Column 5, line 1, after "FIGS" insert --1,--;
line 2, after "78" insert --forming support means--;
line 27, after "92" insert --forming L-shaped brackets with members 90 when the pull-down assembly is in the retracted position as shown in Fig. 2,--; same line, delete "are" and insert --is--.
line 42, delete "a" and after "first" delete "end" and substitute --ends--;
line 44, delete "A";
line 45, delete "second end" and insert --Second ends--;
line 52, delete "end" and insert --ends--.

Column 6, line 12, delete "We" and insert --I--.

Signed and sealed this 5th day of March 1974.

(SEAL)
Attest:

EDWARD M. FLETCHER, JR.          C. MARSHALL DANN
Attesting Officer                Commissioner of Patents